United States Patent Office 3,686,156
Patented Aug. 22, 1972

3,686,156
CURING DIALKYL XANTHOGEN DISULFIDE-MODIFIED CHLOROPRENE SOL POLYMERS WITH AMINES
John F. Hagman, Wilmington, Del., assignor to E. I. du Pont de Nemours and Company, Wilmington, Del.
No Drawing. Filed May 26, 1970, Ser. No. 40,706
Int. Cl. C08c *11/44*; C08d *3/14*
U.S. Cl. 260—92.3
10 Claims

ABSTRACT OF THE DISCLOSURE

Sol polymers of chloroprene having a Mooney viscosity (ML 1+2.5/100° C.) greater than 25, polymerized in the presence of dialkyl xanthogen disulfides but no elemental sulfur, are given increased tensile strengths, as compared with corresponding polychloroprenes polymerized in the presence of alkyl-mercaptans instead of the xanthogen disulfides, by curing in the presence of zinc oxide with an organic amine of the formula

wherein R is an organic radical and R' and R" are each hydrogen or an organic radical, each R is attached to the nitrogen by one covalent bond, and in each organic radical present the carbon atom directly attached to the nitrogen atom is free of substituents, other than carbons, attached thereto by a double bond.

BACKGROUND OF THE INVENTION

Neoprenes, i.e. chloroprene polymers, have been commercially available since 1932 and have enjoyed wide acceptance as versatile elastomers having good resistance to oils, solvents and greases, superior aging resistance and flame resistance, and good film strength. Despite the already superior properties of these polymers still further improvement is constantly being sought to meet the increasingly rigorous demands of modern technology. Increases in tensile strength are especially desirable.

Neoprenes having certain desirable properties have already been made by polymerizing chloroprene, optionally with another copolymerizable monomer, in the presence of modifying agents such as sulfur, which copolymerizes with the chloroprene, or alkyl mercaptans, which are chain-transfer agents. It has also been proposed to use dialkyl xanthogen disulfides as modifying or chain-transfer agents for chloroprene polymers (see Meisenberg U.S. Pat. 2,321,693 and Mochel U.S. Pat. 2,567,117) but such polymers have attained only limited commercial use.

Amines have been disclosed as curing or vulcanizing agents for conventional chloroprene polymers. U.S. Pat. 2,395,493 discloses polyamines for this purpose; the examples of this patent, however, show only tetraethylenepentamine as a curing agent for Neoprene G, a sulfur-modified polychloroprene. British Pat. 905,971 discloses rendering air-curable certain fluid, low-molecular-weight, alkyl xanthogen-disulfide-modified chloroprene polymers by incorporating amines into the fluid mix. The use of amines as "pre-vulcanizing" agents for alkyl-xanthogen-disulfide-modified chloroprene polymer latexes has been disclosed in Apotheker U.S. Pats. 3,300,433 and 3,317,451. It will be noted that none of these disclosures suggests that useful results could be achieved by curing solid chloroprene polymers, unmodified by sulfur, with amines, or that chloroprene polymer vulcanizates of superior tensile strength could be prepared by cross-linking with an amine a high-molecular-weight, isolated polymer which had been prepared in the presence of a dialkyy xanthogen disulfide.

SUMMARY

Now according to the present invention it has been found that if chloroprene is polymerized in the presence of a dialkyl xanthogen disulfide but no elemental sulfur to a solid sol polychloroprene having a Mooney viscosity (ML 1+2.5/100° C.) greater than 25 and this polychloroprene is cured in the presence of zinc oxide with an organic amine of the formula

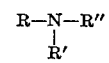

wherein R is an organic radical and R' and R" are each hydrogen or an organic radical, each R is attached to the nitrogen by one covalent bond, and in each organic radical present the carbon atom directly attached to the nitrogen atom is free of substituents, other than carbons, attached thereto by a double bond, the cured products obtained have increased tensile strengths as compared with corresponding polychloroprenes polymerized in the presence of alkyl mercaptans instead of the dialkyl xanthogen disulfide.

The invention thus provides improved processes for polymerizing chloroprenes and curing the polymerizates and also improved polymer products.

DESCRIPTION OF THE PREFERRED EMBODIMENTS

The sol polymer

The sol polymers which are amine-cured according to this invention are solids—that is, they are neither fluids nor latexes. They have a Mooney viscosity (ML 1+2.5/100° C.) of at least 25, which represents a molecular weight of at least 100,000. They are soluble in benzene. They can be prepared by processes with which the art is already familiar and which are described, for instance, in U.S. Pat. 3,042,652 to Pariser et al.; 3,147,317 to Jungk and Pariser; and 3,147,318 to Jungk.

The dialkyl xanthogen disulfides used for modifying the sol polychloroprene can be represented by the structure:

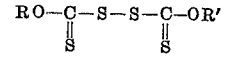

wherein R and R' are alkyl radicals having one to eight carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1 to 4 carbon atoms.

The amounts of particular dialkyl xanthogen disulfides used will vary somewhat with the molecular weight of the compound. However, for unknown reasons, there are small differences in modifying effectiveness among molecularly equivalent amounts of various dialkyl xanthogen disulfides. For this reason, the amount of dialkyl xanthogen disulfide is defined herein in terms of the effective amount of diethyl xanthogen disulfide, which effective amount ranges from about 0.15 to about 1 part per 100 parts of monomer. To determine the equivalent amounts of another dialkyl xanthogen disulfide, one may, for example, plot the Mooney viscosities of polymers prepared in the presence of varying amounts of the other dialkyl xanthogen disulfide and compare it with a similar plot prepared using varying amounts of diethyl xanthogen disulfide. The amounts of diethyl xanthogen disulfide called for (0.15 to 1 part per 100 parts of monomer) are those amounts which yield benzene-soluble chloroprene polymers having Mooney viscosities within a practical range. The preferred range of diethyl xanthogen disulfide is from 0.3 to 0.6 part.

The polymerization may be carried out in aqueous emulsion using a free-radical polymerization catalyst such as an alkali metal persulfate.

Any of the conventional emulsifying agents can be used in preparing the monomer emulsion. These include the water-soluble salts, particularly the sodium or potassium salts, of compounds of the following types: long-chain fatty acids; rosins or rosin derivatives, such as wood rosin, tall oil rosin, disproportionated rosins, or partially polymerized rosin; higher alcohol sulfates; and arylsulfonic acids such as alkylbenzenesulfonic acids and the condensation product of formaldehyde with a naphthalenesulfonic acid.

The concentration of organic monomer present in the starting emulsion is not critical. In general, 30 to 60 percent by weight, based on the total weight of the emulsion is the range of concentrations of organic monomer used in the preparation of the polymer.

It is preferred that the pH be in the alkaline range.

The polymerization may be carried out between 0° C. and 80° C., preferably between 30° and 50° C.

Polymerization is stopped at a monomer conversion at which benzene-soluble polymer is obtained. The desirable point at which to stop polymerization will depend somewhat on the amount of alkyl xanthogen disulfide used, but, in general, will range from about 50% to about 70% conversion. Polymerization is stopped by use of conventional "short-stopping" agents such as are disclosed in U.S. Pat. 2,576,009. Unreacted monomer is removed by known methods, such as by steam stripping as disclosed in U.S. Pat. 2,467,769.

It is to be understood that up to 50% of the chloroprene can be replaced by another copolymerizable monomer. Examples of suitable comonomers are:

Vinyl aromatic compounds, such as styrene, the vinyl toluenes, and vinylnaphthalenes;

Aliphatic conjugated diolefin compounds such as 1,3-butadiene; isoprene; 2,3-dimethyl-1,3-butadiene; and 2,3-dichloro-1,3-butadiene.

Vinyl ethers, esters, and ketones, such as methyl vinyl ether, vinyl acetate, and methyl vinyl ketone;

Esters, amides, and nitriles of acrylic and methacrylic acids, such as ethyl acrylate, methyl methacrylate, methacrylamine, and acrylonitrile.

The organic amine

Amine is meant to include the compounds which fall within the scope of this term as generally accepted by organic chemists. They are organic derivatives of ammonia which may be represented by the general formula

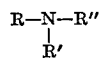

wherein R is an organic radical and R' and R" may be hydrogen or an organic radical, each R is attached to the nitrogen by one covalent bond, and in each organic radical the carbon atom directly attached to the nitrogen is free of substituents, other than carbon atoms, attached thereto by a double bond (e.g., oxo, thiono, or imino groups). At least one of R' and R" may be a radical which, at curing temperatures, decomposes to form an R—NH—R' or R—NH₂ group, and in the formula the Rs may be joined to incorporate the nitrogen into a heterocyclic ring, which ring may contain other atoms such as oxygen, sulfur, or other nitrogen atoms.

The amines may be primary, secondary, or tertiary. The radicals attached to the nitrogen may be aliphatic, cycloaliphatic, or aromatic or as stated above the nitrogen may form part of a heterocyclic ring. The organic radicals may be substituted with non-hydrocarbon substituents such as halogen, hydroxyl, alkoxy, aryloxy, carbonyl, carboxyl, cyano groups, or the analogs of the above in which oxygen has been replaced by sulfur. The organic radicals may also be substituted with other amino radicals of the same general type described above.

The amines described above should have in the form of their free bases dissociation constants in water in the range of about $10^{-3}$ to about $10^{-10}$. (The dissociation constant here is the base constant, $K_b$, which can be expressed as follows:

$$K_b = \frac{[\text{acid form of amine}][\text{OH}^-]}{[\text{free amine}]}$$

The brackets represent the concentration of the material in solution.)

The amines may be used in the form of their salts with organic or inorganic acids. Examples of suitable salts include hydrochlorides, phosphates, borates, acetates, oxalates, fumarates, phthalates, succinates, adipates and maleates, etc.

Examples of compounds which readily yield the amine on heating at curing temperatures are the so-called "amine carbamates," which are reaction products of amines with carbon dioxide. In these compounds at least one amine is actually incorporated into the carbamate functional group,

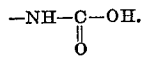

In practicing this invention it is particularly advantageous to use an amine containing at least one tertiary amino group in which two of the substituents are lower alkyl radicals containing one to three carbon atoms. Effectiveness of the amine is enhanced in many cases by the presence of an oxygen atom in a position beta to the amino group.

An especially versatile amine is 2-dimethylaminoethanol and salts and esters thereof with organic carboxy-containing acids. These organic acids may be organic mono- or di-functional carboxylic acids. Alternatively, the hydroxy group may be reacted with organic mono- or diisocyanates to yield the ester with the corresponding carbamic acid. Examples of isocyanates which may be used are aliphatic mono- or diisocyanates having one to 20 carbon atoms, aryl isocyanates such as phenyl, tolyl, and naphthyl isocyanates, and arylene polyisocyanates such as 2,4-tolylene diisocyanate, 2,6-tolylene diisocyanate, 4,4'-methylene-bis(phenyl isocyanate), 1,5-naphthalene diisocyanate, and dimers and trimers of these compounds, polyphenyl polyisocyanates of the type disclosed in U.S. Pat. 2,683,780, tris(isocyanatophenyl)methane, and tris(isocyanatophenyl) phosphates and thiophosphates.

Other tertiary amines which may be used to particular advantage are those in which R is a methyl group and R' and R" together form a five- to seven-membered ring which may contain more than one nitrogen atom. Examples are 1-methyl-piperidine, 1-methylpyrrolidine, 1-methylhexamethylenimine, 1,3-dimethylimidazoline, and 1,4-dimethylpiperazine. Another amine giving excellent results is one in which two nitrogens are joined by three ethylene radicals to form an 8-membered bicyclic structure. This compound, which is known by the trivial name, triethylenediamine, and the Chemical Abstracts name, 1,4-diazabicyclo[2.2.2]octane, is available commercially from Houdry Process and Chemical Co. under the trade mark "Dabco."

Other examples of dimethyl-substituted amines include the Mannich bases such as are disclosed in Verbanc U.S. Patent 2,670,342. Examples of amines containing oxygen in a position beta to the nitrogen are N-methyldiethanolamine, triethanolamine, tris(2-hydroxypropyl)amine, and 4-methylmorpholine. In general, less desirable results are obtained when the amine is substituted with two or more groups having four or more carbon atoms, particularly when the radicals contain branching. This is probably due to steric effects, although even in these less-than-optimum cases the xanthogen-modified chloroprene polymers give higher tensile strengths than the mercaptan-modified chloroprene polymers.

It has further been found according to this invention that if, in addition to the organic amine curing agent there is also present tetramethylguanidine, cured products having improved resistance to compression set are obtained. An amount of the tetramethylguanidine in the range from 0.2 to 1 parts by weight per 100 parts by weight of polymer has this effect.

The amount of the amine curing agent to be used will vary with the molecular weight of the amine and the effectiveness of the particular amine. In general, the range to be used will be an amount which will yield about 0.005 to about 0.09 gram equivalent wts. of amine per 100 grams of elastomer. The preferred range is obout 0.02 to about 0.05 gram equivalent weights per 100 grams of elastomer. Thus for aniline the preferred range would be from 1.86 to 4.66 grams per 100 grams of elastomer, whereas for o-phenylene diamine the range would be from 1.08 to 2.70 grams per 100 grams of elastomer.

Other ingredients

Zinc oxide must be used in the curing composition in amounts ranging from about 2 to 15 parts per 100 parts of polymer; 5 parts is the amount most often used.

Optionally, magnesia additionally may be used in amounts from about 0.5 to 15 parts per 100 parts of polymer. This is not essential, and excellent cures may be obtained using curing recipes which contain no magnesia. The addition of magnesia to the recipe will usually improve the scorch resistance of the compounded stock.

Other conventional compounding ingredients also may be used. These include such things as pigments and fillers (e.g., carbon black, clay, titanium dioxide, etc.), antioxidants, softening agents, plasticizers, and extenders (e.g. petroleum oils and the ester plasticizers such as dioctyl sebacate and butyloleate).

Curing the chloroprene polymer

Conventional methods of compounding, curing, and fabricating will be used which are well known to those skilled in the art. Some of these are described, for instance, in Chapters II and III of "The Neoprenes" by R. M. Murray and D. C. Thompson, published by E. I. du Pont de Nemours and Co. in 1963.

Temperatures of curing are ordinarily in the range from 250 to 450° F.

EXAMPLES

The invention will be better understood by reference to the following illustrative examples. The chloroprene polymers on which the amine-curing tests are made will first be identified.

Polychloroprene A

This is a chloroprene polymer prepared using the following recipe.

|  | Parts by weight |
|---|---|
| Chloroprene | 100 |
| Disproportionated rosin ("Resin 731-SA", Hercules) | 3 |
| Diethyl xanthogen disulfide | 0.45 |
| Water | 91.5 |
| Sodium hydroxide | 0.55 |
| Sodium salt of condensate of formaldehyde and naphthalenesulfonic acid, ("Lomar" PW, Nopco Chemical Co.) | 0.40 |

The catalyst is an aqueous solution containing 0.15% potassium persulfate and about 0.008% sodium 2-anthraquinone-sulfonate, which is added gradually to obtain the desired rate of polymerization. Polymerization is carried out at 40° C. to a conversion of 70%. Polymerization is stopped by addition of about 1.53 parts of an emulsion containing 0.014 part of phenothiazine, 0.014 part of 4-tert-butylpyrocatechol, and 0.412 part of 2,6-di-tert-butyl-4-phenylphenol. The latex is freed of unreacted monomer by turbannular steam stripping, essentially as described in U.S. Pat. 2,467,769. The emulsion is acidified to a pH of about 5.6 with 10% acetic acid, and the polymer is isolated by freeze rolling as described in U.S. Pat. 2,187,146. The isolated polymer is a sol polymer which has a Mooney viscosity (ML 1+2.5/100° C.) of 45-54.

Polychloroprene B

This polychloroprene is prepared in essentially the same manner as Polychloroprene A except that 0.62 part of diisopropyl xanthogen disulfide is used in the polymerization recipe in place of the diethyl xanthogen disulfide.

Polychloroprene C

This polychloroprene is prepared in essentially the same manner as Polychloroprene A except that 0.35 part of dimethyl xanthogen disulfide is used in the polymerization recipe in place of the diethyl xanthogen disulfide.

Polychloroprene D

For comparison, a sol polymer is tested which has been prepared in the presence of technical dodecyl mercaptan instead of the alkyl xanthogen disulfides of Polychloroprenes A, B and C above. It has a Mooney viscosity (ML 1+2.5/100° C.) of 45-54. Preparation is essentially as described in Exampe 6 of U.S. Pat. 2,494,087.

EXAMPLE 1

Compounded stocks are prepared using the following recipe:

|  | Parts by weight |
|---|---|
| Elastomer | 100 |
| N-phenyl-1-naphthyl amine | 2 |
| Stearic acid | 0.5 |
| Zinc oxide | 5 |
| Magnesia | 2 |
| Semi-reinforcing furnace black | 58 |
| Process oil | 10 |
| Amine (varied) | Varied |

Curing is carried out in a mold under pressure for 20 minutes at 153° C. Tensile strength is measured using ASTM Method D 412-64 T.

The amines tested and test results are shown in Table I. $T_S$ refers to tensile strength at break in pounds per square inch.

TABLE I

| | | | $T_S$ polymer— | |
|---|---|---|---|---|
| | Amine | Parts | A | D |
| Experiment: | | | | |
| 1 | n-Dodecylamine | 3.7 | 3,175 | 2,650 |
| 2 | t-Octylamine | 2.8 | 2,400 | 900 |
| 3 | 1-amino-2-propanol | 1.6 | 2,000 | 2,125 |
| 4 | Piperidine oxalate | 2.6 | 3,200 | 2,900 |

When Elastomer C is used, the following tensile strengths are obtained.

| | Amine | Parts | $T_S$ |
|---|---|---|---|
| Experiment: | | | |
| 5 | Fatty alkyl-dimethylamine (a) | 2 | 3,375 |
| 6 | 2-Dimethylaminoethanol | 2 | 3,525 |

(a) $R-N(CH^3)_2$, where R is predominantly a mixture of octadecyl and hexadecyl radicals, 92% tertiary amine ("Armeen" DMHTD, Armour Industrial Chemical Co.).

EXAMPLE 2

This example is carried out in the same way as Example 1 except that the compounding recipe contains no magnesia. Table II shows the amine accelerators used and the tensile strengths measured.

TABLE II

| | Amine | Parts | Ts, polymer— A | D |
|---|---|---|---|---|
| Experiment: | | | | |
| 1 | Aniline | 2.0 | 2,900 | 2,625 |
| 2 | Dicyclohexylamine | 2.6 | 2,230 | 900 |
| 3 | Tributylamine | 3.7 | 2,150 | 800 |
| 4 | Dimethylbenzylamine | 2.7 | 2,925 | 1,750 |
| 5 | Pyridine | 0.65-0.70 | 2,475 | 1,325 |
| 6 | 2-dimethylamino ethanol | 2.0 | 3,375 | 3,025 |
| 7 | Fatty alkyl dimethylamine (same as in experiment 5 of Table I). | 2.0 | 2,750 | 1,125 |

When Elastomer B is substituted in Experiment 6 above, a tensile strength of 3275 p.s.i. is obtained.

EXAMPLE 3

This example is carried out in the same way as Example 1 except that the curing is carried out for 30 minutes.

TABLE III

| | Amine | Parts | Ts, polymer— A | D |
|---|---|---|---|---|
| Experiment: | | | | |
| 1 | 2-dimethylaminoethyl acetate. | 2.9 | 3,100 | 2,350 |
| 2 | 2-dimethylaminoethyl benzoate | 4 | 3,075 | 2,000 |
| 3 | 2-dimethylaminoethyl methacrylate. | 3.5 | 3,150 | 2,000 |
| 4 | 2-dimethylaminoethanol, salt with oxalic acid. | 4 | 2,900 | 2,175 |
| 5 | 2-dimethylaminoethanol, salt with fumaric acid. | 4.6 | 3,050 | 2,300 |
| 6 | Trimethylamine, salt with phthalic acid. | 5.7 | 2,850 | 2,200 |
| 7 | Trimethylamine, salt with oxalic acid. | 2.8 | 2,850 | 2,600 |
| 8 | 1,3-bis(dimethylamino(-2-propanol. | 4 | 3,050 | 1,450 |
| 9 | N,N'-methylenebis-(dimethylamine). | 1.35 | 3,500 | 1,600 |
| 10 | N,N,N',N'-tetramethyl-enediamine. | 1.04 | 3,575 | 1,725 |
| 11 | 2-dimethylamino-2-methyl-1-propanol. | 2.3 | 3,125 | 2,700 |

EXAMPLE 4

In this example a clay-filled stock is prepared using the following recipe:

| | Parts |
|---|---|
| Elastomer | 100 |
| N-phenyl-1-naphthylamine | 2 |
| Stearic acid | 0.5 |
| Hard clay | 90 |
| Paraffin | 1 |
| Petrolatum | 1 |
| Naphthenic oil | 12 |
| ZnO | 5 |
| 1,4-Diazabicyclo[2.2.2]octane | 2 |

The same elastomers are used as in Example 1 and in addition an elastomer (Elastomer B) is used which has been prepared in the presence of diisopropyl xanthogen disulfide.

Curing is carried out for 20 minutes at 153° C. Table IV shows the tensile strengths measured.

TABLE IV

| | Elastomer | Tensile strength at break, p.s.i. |
|---|---|---|
| Experiment: | | |
| 1 | Elastomer A (modified with diethyl xanthogen disulfide). | 3,350 |
| 2 | Elastomer B (modified with diisopropyl-xanthogen sisulfide). | 2,875 |
| 3 | Elastomer D (modified with dodecyl mercaptan). | 1,900 |

I claim:
1. In a process for producing an amine-cured polychloroprene having high tensile strength the steps comprising (1) mixing (a) a solid sol polychloroprene polymerized in the presence of a dialkyl xanthogen disulfide but no elemental sulfur and having a Mooney viscosity (ML 1+2.5/100° C.) greater than 25, (b) zinc oxide, and (c) an organic amine which, in the form of its free base has a dissociation constant in water in the range of about $10^{-3}$ to $10^{-10}$, and has the formula

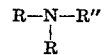

wherein R is an organic radical and R' and R" are each hydrogen or an organic radical, the organic radicals attached to the nitrogen atom are aliphatic, cycloaliphatic, aromatic, or the nitrogen is part of a heterocyclic ring, each R is attached to the nitrogen by one covalent bond, and in each organic radical present the carbon atom directly attached to the nitrogen is free of substituents, other than carbons, attached thereto by a double bond, and (2) heating the mixture so obtained at a temperature of 250 to 450° F. to effect cross-linking in the polymer.

2. In a process for producing an amine-cured polychloroprene having high tensile strength the steps comprising (1) polymerizing chloroprene in the absence of elemental sulfur and in contact with dialkyl xanthogen disulfide in an amount equivalent to about from 0.15 to 1 parts by weight, per 100 parts of chloroprene, of diethyl xanthogen disulfide to form a solid sol polychloroprene having a Mooney viscosity (ML 1+2.5/100° C.) greater than 25, (2) mixing said sol polychloroprene with zinc oxide and an organic amine which, in the form of its free base has a dissociation constant in water in the range of about $10^{-3}$ to $10^{-10}$, and has the formula

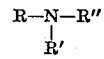

wherein R is an organic radical and R' and R" are each hydrogen or an organic radical, the organic radicals attached to the nitrogen atom are aliphatic, cycloaliphatic, or aromatic, or the nitrogen is part of a heterocyclic ring, each R is attached to the nitrogen by one covalent bond, and in each organic radical present the carbon atom directly attached to the nitrogen is free of substituents, other than carbons, attached thereto by a double bond, and (3) heating the mixture so obtained at a temperature of 250 to 450° F. to effect cross-linking in the polymer.

3. A process of claim 2 wherein the amount of organic amine added to the mixture in step (2) is about from 0.005 to 0.09 gram equivalent weights per 100 grams of elastomer.

4. A process of claim 2 wherein the amount of zinc oxide added to the mixture in step (2) is about from 2 to 15 parts by weight per 100 parts by weight of polymer.

5. A process of claim 2 wherein the organic amine is triethylenediamine.

6. A process of claim 2 wherein the organic amine is dimethylethanolamine.

7. A process of claim 2 wherein the organic amine is a reaction product of dimethylethanolamine and toluene diisocyanate.

8. A process of claim 2 wherein the alkyl xanthogen disulfide is diethyl xanthogen disulfide.

9. A process of claim 2 wherein the alkyl xanthogen disulfide is di-n-propyl xanthogen disulfide.

10. A process of claim 2 wherein the organic amine contains at least one tertiary amino group in which two of the substituents are lower alkyl radicals containing one to three carbon atoms.

References Cited

UNITED STATES PATENTS

| | | | |
|---|---|---|---|
| 3,300,433 | 1/1967 | Apotheker | 260—29.7 |
| 3,392,134 | 7/1968 | Apotheker | 260—29.7 |
| 3,472,828 | 10/1969 | Montgomery | 260—92.3 |
| 3,502,628 | 3/1970 | Barney | 260—87.7 |

JOSEPH L. SCHOFER, Primary Examiner

C. A. HENDERSON, Jr., Assistant Examiner

U.S. Cl. X.R.

260—63, 80.3 N, 80.3 E, 83.3, 83.5, 85.1